US008219306B2

(12) United States Patent
Kim et al.

(10) Patent No.: US 8,219,306 B2
(45) Date of Patent: Jul. 10, 2012

(54) APPARATUS AND METHOD FOR PROVIDING TRAFFIC JAM INFORMATION, AND APPARATUS FOR RECEIVING TRAFFIC JAM INFORMATION FOR AUTOMOBILE

(75) Inventors: Jin-Kyeong Kim, Daejon (KR); Woo-Yong Lee, Daejon (KR); Yong-Sun Kim, Daejon (KR); Kyeong-Pyo Kim, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 484 days.

(21) Appl. No.: 12/086,085

(22) PCT Filed: Dec. 7, 2006

(86) PCT No.: PCT/KR2006/005258
§ 371 (c)(1),
(2), (4) Date: Jun. 5, 2008

(87) PCT Pub. No.: WO2007/066983
PCT Pub. Date: Jun. 14, 2007

(65) Prior Publication Data

US 2009/0271100 A1 Oct. 29, 2009

(30) Foreign Application Priority Data

Dec. 8, 2005 (KR) ........................ 10-2005-0119430
May 3, 2006 (KR) ........................ 10-2006-0040129

(51) Int. Cl.

| | |
|---|---|
| ***G06F 19/00*** | (2011.01) |
| ***G06G 7/70*** | (2006.01) |
| ***G06G 7/76*** | (2006.01) |
| ***G06G 1/00*** | (2006.01) |

(52) U.S. Cl. ........ 701/118; 701/116; 701/117; 701/119; 340/933; 340/934; 340/936

(58) Field of Classification Search .......... 701/117–119; 340/933, 934, 936, 938, 943; 367/93
See application file for complete search history.

(56) References Cited

U.S. PATENT DOCUMENTS 5,314,037 A 5/1994 Shaw et al.
(Continued)

FOREIGN PATENT DOCUMENTS

JP 09326097 A * 12/1997
JP 10162277 A * 6/1998
JP 2000339584 A * 12/2000
JP 2000339585 A * 12/2000
(Continued)

OTHER PUBLICATIONS

JP 2003281682 English translation.*

*Primary Examiner* — Hussein Elchanti
*Assistant Examiner* — Rami Khatib
(74) *Attorney, Agent, or Firm* — Staas & Halsey LLP

(57) ABSTRACT

The present invention includes a traffic information collection unit for collecting weight information of a vehicle running on a road and vibration and noise information generated on the road; a traffic jam determination unit for determining a traffic jam and traffic jam type based on the collected weight information, the vibration and noise information; a traffic jam information transceiving unit for transmitting the traffic jam information or the received traffic jam information of a front road to a vehicle on a rear road by receiving the traffic jam information of a front road from another apparatus for providing traffic jam information installed on the front road; and a display unit for displaying the determination result of the traffic jam determination unit, or a traffic condition of the front road.

15 Claims, 8 Drawing Sheets

U.S. PATENT DOCUMENTS

| | | | | | |
|---|---|---|---|---|---|
| 5,416,711 | A * | 5/1995 | Gran et al. | .................... | 701/117 |
| 5,673,039 | A * | 9/1997 | Pietzsch et al. | ............... | 340/905 |
| 5,931,547 | A | 8/1999 | Lerner | | |
| 6,151,550 | A * | 11/2000 | Nakatani | ....................... | 701/117 |
| 6,188,778 | B1 * | 2/2001 | Higashikubo et al. | ........ | 382/104 |
| 6,900,740 | B2 * | 5/2005 | Bloomquist et al. | .......... | 340/905 |
| 6,911,918 | B2 | 6/2005 | Chen | | |
| 7,068,186 | B2 * | 6/2006 | Hill et al. | ...................... | 340/942 |
| 2002/0040270 | A1 * | 4/2002 | Kwak et al. | ................... | 701/200 |
| 2002/0158922 | A1 * | 10/2002 | Clark et al. | ................... | 345/864 |
| 2004/0117107 | A1 | 6/2004 | Lee | | |

FOREIGN PATENT DOCUMENTS

| | | | |
|---|---|---|---|
| JP | 2003281682 | A * | 10/2003 |
| JP | 2005-62162 | | 3/2005 |
| KR | 10-2001-0084335 | | 9/2001 |
| KR | 20-0247825 | | 10/2001 |
| KR | 20-0257747 | | 12/2001 |
| KR | 10-2002-0058351 | | 7/2002 |
| KR | 10-2002-0090044 | | 11/2002 |
| KR | 10-0370109 | | 1/2003 |
| KR | 10-2004-0032516 | | 4/2004 |

* cited by examiner

APPARATUS AND METHOD FOR PROVIDING TRAFFIC JAM INFORMATION, AND APPARATUS FOR RECEIVING TRAFFIC JAM INFORMATION FOR AUTOMOBILE

CROSS REFERENCE TO RELATED APPLICATIONS

This application claims the benefit under 35 U.S.C. Section 371, of PCT International Application Number PCT/KR2006/005258, filed Dec. 7, 2006 and Korean Applications Nos. 10-2005-0119430 and 10-2006-0040129, filed Dec. 8, 2005 and May 3, 2006, respectively, in Korea, the contents of all of which are incorporated herein by reference.

TECHNICAL FIELD

The present invention relates to an apparatus and method installed on a road and providing traffic jam information, and an apparatus for receiving traffic jam information for an automobile; and, more particularly, to an apparatus and method for providing traffic jam information installed on a road, and a traffic jam information receiving apparatus mounted on an automobile, which enables a user, or driver to recognize a traffic condition in real-time and keeps the user away from an accident by collecting traffic information, e.g., weight, vibration, noise, obtaining the traffic condition information such as the presence of traffic jam or a type of the traffic jam based on the collected traffic information, and providing the user, or driver with the obtained traffic condition information in a visual manner.

BACKGROUND ART

A conventional technique for providing traffic information using a display board and a mobile phone provides a traffic condition on a road ahead of a user by showing a traffic condition of each road section collected in a traffic center through a display board installed on a road or using a traffic information providing service of the cellular phone.

However, the conventional technique has problems that it is difficult to provide traffic jam information associated with a traffic accident or simple traffic jam information in real-time, and a possibility of a traffic accident increases since a user does not receive traffic accident information and traffic jam information on the road ahead of the user.

Another conventional traffic accident detection technique detects a traffic accident based on vehicle density on a road. That is, in the conventional traffic accident detection technique, a traffic accident on a road is detected in a short time by consistently monitoring vehicle density on a road in a short time, and a traffic accident is determined in case that a current vehicle density is larger than a predetermined value while the current vehicle density is compared with a previous vehicle density.

However, this conventional technique is advantageous effect, when a traffic accident is detected based on a vehicle density of a specific area. However, it is difficult to discriminate a simple traffic jam or a traffic jam caused by a traffic accident, and there is a problem that a user who does not receive traffic information on the road ahead of him or her may cause another a accident.

DISCLOSURE

Technical Problem

It is, therefore, an object of the present invention to provide to an apparatus and method installed on a road and providing traffic jam information, and an apparatus for receiving traffic jam information for an automobile, which enables a user, or driver to recognize a traffic condition in real-time and keeps the user away from an accident by collecting the traffic information, e.g., weight, vibration, noise, obtaining the traffic condition information of a traffic jam or a type of the traffic jam based on the collected traffic information, and providing the user, or driver with the obtained traffic information in a visual manner.

The other objectives and advantages of the invention will be understood by the following description and will also be appreciated by the embodiments of the invention more clearly. Further, the objectives and advantages of the invention will readily be seen that they can be realized by the means and its combination specified in the claims.

Technical Solution

In accordance with an embodiment of the present invention, there is provided an apparatus installed on a road and providing traffic jam information including: a traffic information collection unit for collecting weight information of a vehicle running on a road and vibration and noise information generated on the road; a traffic jam determination unit for determining a traffic jam and traffic jam type based on the collected weight information, the vibration and noise information; in a case that the traffic jam is determined by the traffic jam determination unit, a traffic jam information transceiving unit for transmitting the traffic jam information including 'the determination result of the traffic jam determination unit' and 'additional information for calculating a distance to a point where the traffic jam information is transmitted', or transmitting the received traffic jam information of a front road to a vehicle on a rear road after acquiring 'the distance of the transmitting point of the traffic jam information' and 'the traffic jam type' by receiving the traffic jam information of a front road from another apparatus for providing traffic jam information installed on the front road; and a display unit for displaying the determination result of the traffic jam determination unit, or a traffic condition of the front road based on the distance information and traffic jam type information acquired from the traffic jam information transceiving unit.

In accordance with another embodiment of the present invention, there is provided a method for providing traffic jam information, including the steps of: collecting weight information of a vehicle running on a road and vibration and noise information generated on the road; determining a traffic jam and traffic jam type based on the collected weight information, the vibration and noise information; in a case that the traffic jam is determined by the traffic jam determination means, transmitting the traffic jam information including 'the determination result in the step of determining the traffic jam' and 'additional information for calculating a distance to a point where the traffic jam information is transmitted'; acquiring 'the distance to the point of the traffic jam information is transmitted' and 'the traffic jam type' by receiving the traffic jam information of a front road from another apparatus for providing traffic jam information installed on the road ahead of the vehicle; and transmitting the received traffic jam information of the road ahead of a vehicle on a rear road after acquiring 'the distance to the point where the traffic jam information is transmitted' and 'the traffic jam type' in the step of acquiring the traffic jam information; and displaying one of the determination result in the step of determining traffic jam and a traffic condition of the front road based on the distance information and traffic jam type information acquired in the step of acquiring the traffic jam information.

In accordance with another embodiment of the present invention, there is provided an apparatus for receiving traffic jam information mounted on a vehicle, including: a traffic jam information receiving unit for receiving the traffic jam information received from a plurality of apparatuses for providing traffic jam information installed on a road ahead of the vehicle, and acquiring 'a distance to the point where the traffic jam information is transmitted' and 'traffic jam type' from the received traffic jam information; and an output unit for informing a user of a traffic condition based on the result acquired from the traffic jam information receiving means.

Advantageous Effects

As mentioned above, the present invention enables a driver to previously recognize traffic jam information before the driver arrives at a traffic jam point, control a speed of a vehicle and prevent another accident from occurring by providing the driver with traffic jam information, such as the presence of traffic jam and type of the traffic jam in real-time.

Moreover, the present invention outputs the traffic jam information through an LED board based on 'a traffic jam type' and 'a distance to traffic jam point', and enables a driver to recognize traffic condition accurately and arouse driver's attention by displaying a distance on a display apparatus in a vehicle or flickering and outputting colors on the LED board in case of a traffic jam raised is associated with an accident.

DESCRIPTION OF DRAWINGS

The above and other objects and features of the present invention will become better understood with regard to the following description of the preferred embodiments given in conjunction with the accompanying drawings, in which.

BEST MODE FOR THE INVENTION

The above-mentioned objects, features, and advantages will be more apparent by the following detailed description associated with the accompanying drawings, and thus, a person skilled in the art will easily carry out the present invention. Further, in the following description, well-known arts will not be described in detail if it appears that they could obscure the invention in unnecessary detail. Hereinafter, preferred embodiments of the present invention will be set forth in detail with reference to the accompanying drawings.

Figure 1:
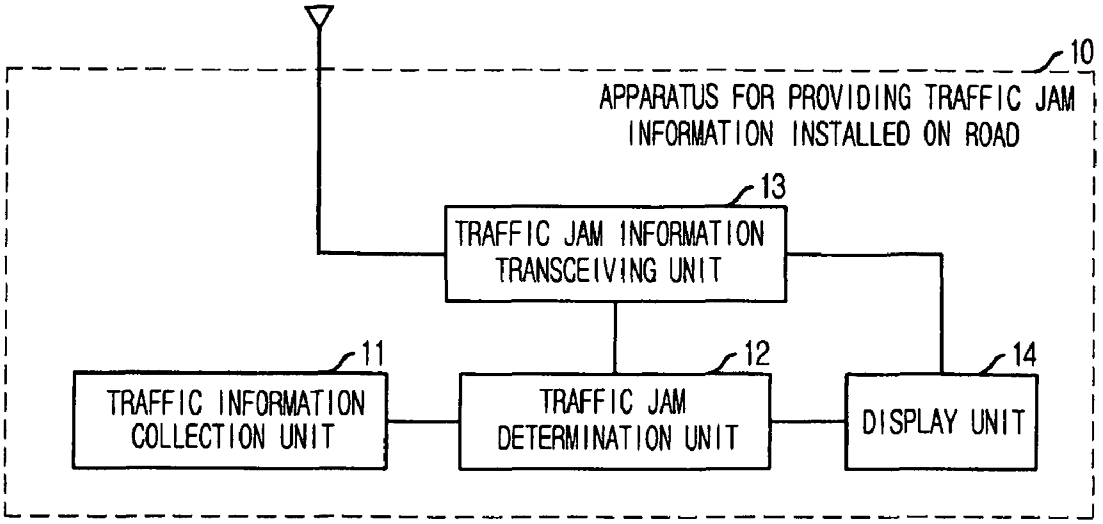
FIG. 1 illustrates an apparatus for providing traffic jam information installed on a road in accordance with an embodiment of the present invention.

FIG. 1 illustrates an apparatus for providing traffic jam information installed on a road in accordance with an embodiment of the present invention.

As shown in FIG. 1, the traffic jam information providing apparatus 10 installed on a road includes a traffic information collection unit 11, a traffic jam determination unit 12, a traffic jam information transceiving unit 13, a display unit 14. Hereinafter each element will be described in detail.

The traffic information collection unit 11 collects the weight information of a vehicle on a road and vibration and noise information on the road. That is, the traffic information collection unit 11 is installed on a road surface, and collects consistently road traffic information through a weight sensor, a vibration sensor and a micro phone. The traffic information collection unit 11 collects data by measuring a weight of a vehicle running on a road for a predetermined time through the weight sensor, and measuring a vibration on a road or a vibration caused by an accident. Moreover, the traffic information collection unit 11 collects data by measuring noise which may be used to determine a traffic accident and a vehicle collision noise over a predetermined noise level through a micro phone.

The traffic jam determination unit 12 determines the presence of the traffic jam and traffic jam type based on the weight information, vibration and noise information collected in the traffic information collection unit 11, and determines a smooth traffic condition in a case that the traffic jam is dismissed. That is, the traffic jam determination unit 12 determines traffic jam based on the weight information and vibration information, and determines whether the traffic jam is induced by a traffic accident based on the noise information.

Here, the traffic jam type is divided into a simple traffic jam without a cause and a traffic jam caused by a traffic accident. That is, the traffic jam determination unit 12 determines the simple traffic jam in case that the measured data of the weight and vibration of the vehicle running on a road are larger than predetermined values, and determines the traffic jam caused by the traffic accident in case that the collision noise and noise of another vehicle are over a predetermined noise value. Next, the traffic jam determination unit 12 determines a smooth traffic condition in case that the measured data are smaller than the predetermined value in a traffic jam condition.

The traffic jam information transceiving unit 13 transmits the traffic jam information including 'the determination result of the traffic jam determination unit 12' and 'additional information for calculating a distance to a point where the traffic jam information is transmitted'.

The traffic jam information transceiving unit 13 transmits the received traffic jam information on a road ahead of a vehicle to a following vehicle on the road through a wireless communication after acquiring 'the distance of the transmitting point of the traffic jam information' and 'the traffic jam type' by receiving the traffic jam information of a front road from another traffic jam information providing apparatus installed on the road ahead.

Figure 10:
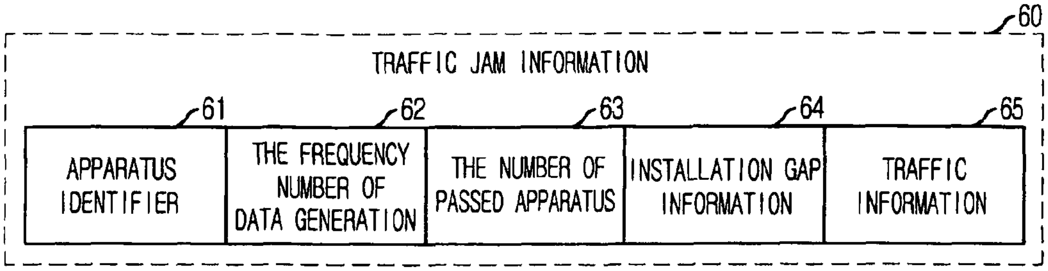
FIG. 10 shows a configuration of traffic jam information used in an apparatus for providing traffic jam information in accordance with an embodiment of the present invention.

The wireless communication includes a wireless LAN, a Bluetooth, a zigbee and the like. The traffic jam information in the traffic jam information transceiving unit 13 includes the number of vehicles passing the apparatus, installation gap, apparatus identifier, the frequency number of data generation. The traffic jam information in the traffic jam information transceiving unit 13 is shown in FIG. 10 and will be described in detail with reference to FIG. 10.

Further, the traffic jam transceiving unit 13 determines a validation of the received traffic jam information of front road by acquiring the 'apparatus identifier and the frequency number of data generation' from the traffic jam information of the front road transmitted from another traffic jam information providing apparatus installed on the road ahead, and comparing the acquired 'apparatus identifier and the frequency number of data generation' with the previously stored apparatus identifier and the frequency number of data generation.

The traffic jam transceiving unit 13 discards the traffic jam information invalidated by the determination result, discriminates and transmits the valid traffic jam information to the display unit 14.

The display unit 14 displays the determination result of the traffic jam determination unit 12, or a traffic condition of the front road based on the distance information and traffic jam type information acquired from the traffic jam information transceiving unit 13. That is, the display unit 14 displays simply or flickeringly the result determined by the traffic jam determination unit 12 through an LED board.

The display unit 14 displays the traffic condition through the LED boards of different color according to the distance information and the traffic jam type information acquired by the traffic jam information transceiving unit 13. Here, the display unit 14 displays the traffic jam information in a color which a user recognizes or by using a character or a symbol in addition to the use of color. An embodiment outputting the traffic jam information using a color in accordance with the present invention will be described in detail in FIG. 3.

Figure 2:
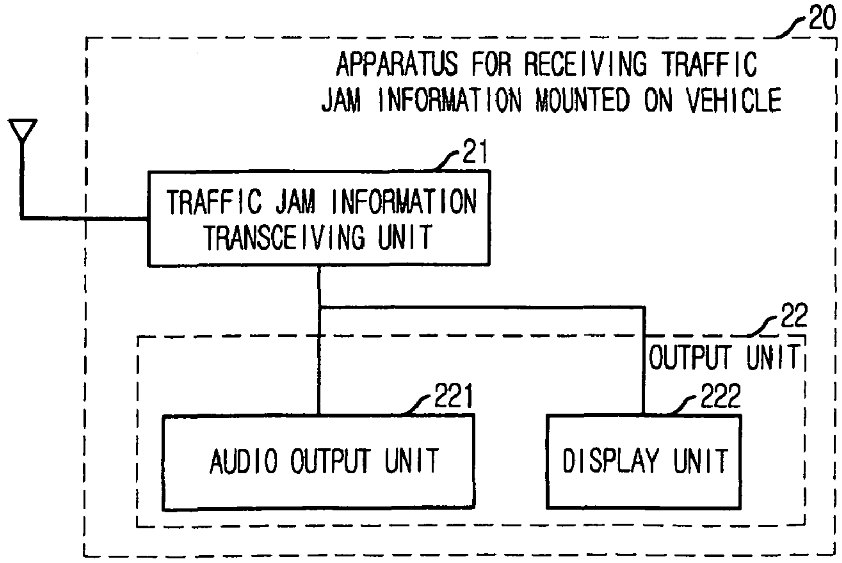
FIG. 2 illustrates an apparatus for receiving traffic jam information mounted on a vehicle.

FIG. 2 illustrates an apparatus for receiving traffic jam information mounted on a vehicle.

As shown in FIG. 2, an apparatus 20 for receiving traffic jam information mounted on a vehicle includes a traffic jam information receiving unit 21, and an output unit 22. The output unit 22 includes an audio output unit 221 and a display unit 222. Hereinafter each element will be described in detail.

The traffic jam information receiving unit 21 receives traffic jam information transmitted from a plurality of apparatuses for providing traffic jam information installed along a road, and acquires the 'distance of transmitting point of traffic jam information' and the 'traffic jam type' from the received traffic jam information.

The traffic jam information in the traffic jam information receiving unit 21 includes a traffic jam, traffic jam types, additional information for calculating a distance of transmitting point of the traffic jam information, apparatus identifier, and the frequency number of data generation. The additional information for calculating the distance of the transmitting point of the traffic jam information includes the number of passed apparatuses and installation gap information.

Moreover, the traffic jam information receiving unit 21 determines a validation of the received traffic jam information based on the apparatus identifier and the frequency number of data generation of the traffic jam information, and discards invalid traffic jam information based on the determination result.

The output unit 22 provides a user with a traffic condition based on the result acquired from the traffic jam information receiving unit 21. The audio output unit 221 and display unit 22 included in the output unit 22 will be described as following.

The audio output unit 221 outputs an audio message including a deceleration request to a driver through a speaker based on the result acquired from the traffic jam information receiving unit 21.

The display unit 222 displays the result acquired from the traffic jam information receiving unit 21. That is, the display unit 222 displays the distance of transmitting point of traffic jam information, acquired from the traffic jam information receiving unit 21 on a character board or LED boards of different color, or displays simply or flickeringly on the LED boards according to the 'traffic jam types'. Moreover the display unit 222 displays the traffic jam information by using a color, a character and a symbol.

The traffic jam information receiving apparatus 20 mounted on a vehicle does not transmit the traffic jam information received through the traffic jam information receiving unit 21 to a neighboring apparatus for providing traffic jam information installed on a road or a traffic jam information receiving apparatus mounted on another vehicle, and outputs only the received traffic jam information.

Figure 3:
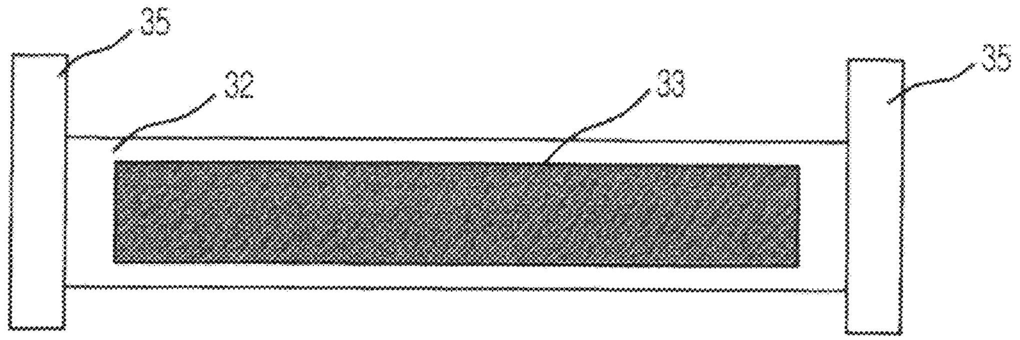
FIGS. 3 and 4 illustrate an LED board in an apparatus for providing traffic jam information installed on a road in accordance with an embodiment of the present invention
Figure 4:
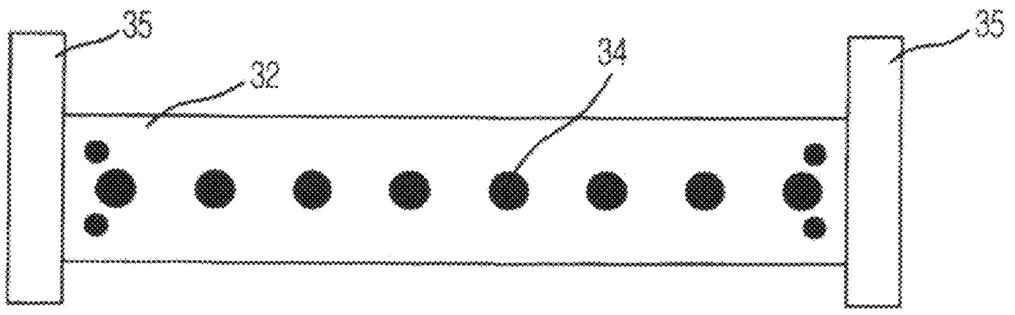
Figure 5:
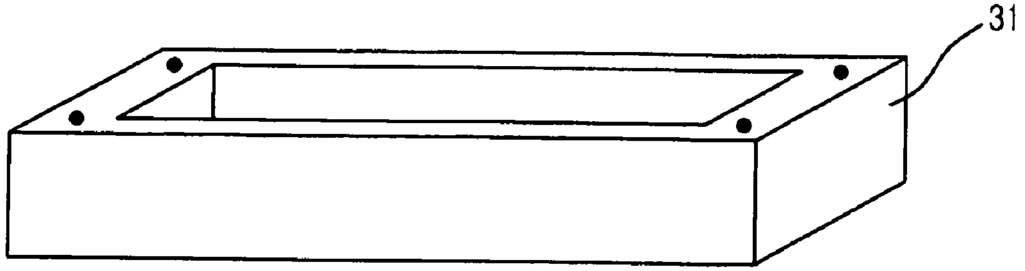
FIG. 5 illustrates a configuration of a traffic jam information providing apparatus installed on a road in accordance with an embodiment of the present invention.

FIGS. 3 and 4 illustrate an LED board in a traffic jam information providing apparatus installed on a road in accordance with an embodiment of the present invention, and FIG. 5 illustrates a configuration of an apparatus for providing traffic jam information installed on a road in accordance with an embodiment of the present invention. Hereinafter, the configuration of the apparatus for providing traffic jam information installed on a road will be described as follows.

As shown in FIGS. 3 to 5, the configuration of the traffic jam information providing apparatus installed on a road includes a body 32 for protecting an instrument, and LED boards 33 and 34 informing a driver of traffic condition to a driver by using different colors.

FIGS. 3 and 4 show two shapes of the LED boards 33 and 34. However, the LED boards 23 can be fabricated in various types to easily display the traffic jam information to the driver.

Also, the apparatus 31 for providing traffic jam information installed on a road should be as long as the width of one lane 35 to correctly collect the traffic jam information. The apparatus 31 for providing traffic jam information installed on a road keeps a driver to away from a traffic accident by using the displayed traffic jam information during driving.

Figure 6:
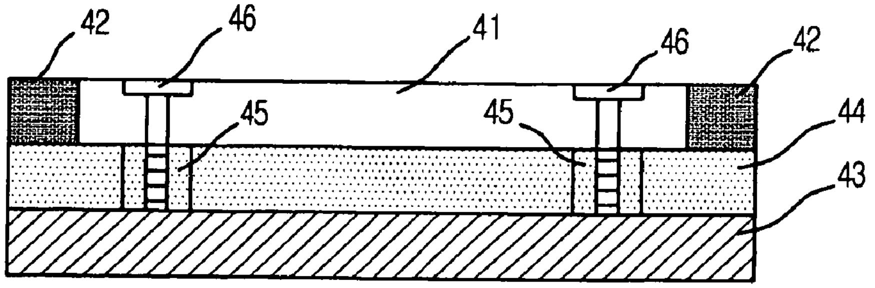
FIG. 6 shows an installation method of an apparatus for providing traffic jam information installed on a road in accordance with an embodiment of the present invention.

FIG. 6 shows an installation method of an apparatus for providing traffic jam information installed on a road in accordance with an embodiment of the present invention. Hereinafter, an installation process of the apparatus for providing traffic jam information installed on a road will be described as follows.

As shown in FIG. 6, the installation process of the apparatus 41 for providing traffic jam information installed on a road is described as follows.

Firstly, a fixing layer 44 for fixing the apparatus for providing traffic jam information installed on a road is installed on a lower layer 43 of the road in a state 42 that a part of the road surface is incised.

The fixing layer 44 is made of a high-strength cement concrete structure having a female screw 45 and a male screw 46 for fixing the apparatus 41 for providing traffic jam information installed on a road.

Next, after the fixing layer 44 is installed on the lower layer 43 of the road, the fixing layer 44 is again fixed on the installation surface by a cement concrete. The apparatus 41 for providing traffic jam information installed on a road is fixed on the fixing layer 44 by the male screw 46.

Figure 7:
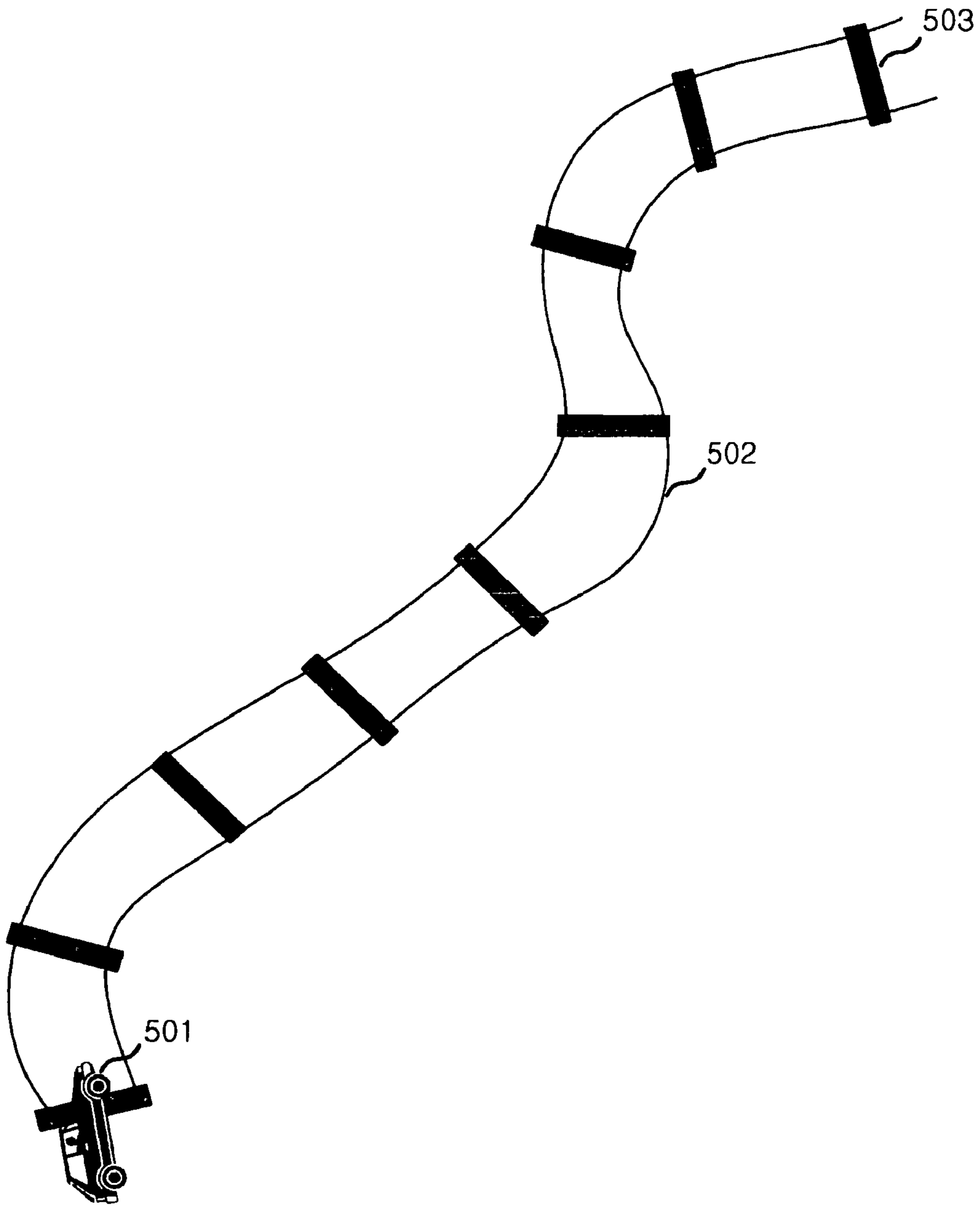
FIG. 7 shows a method for providing traffic jam information in a smooth traffic condition in accordance with an embodiment of the present invention.
Figure 8:
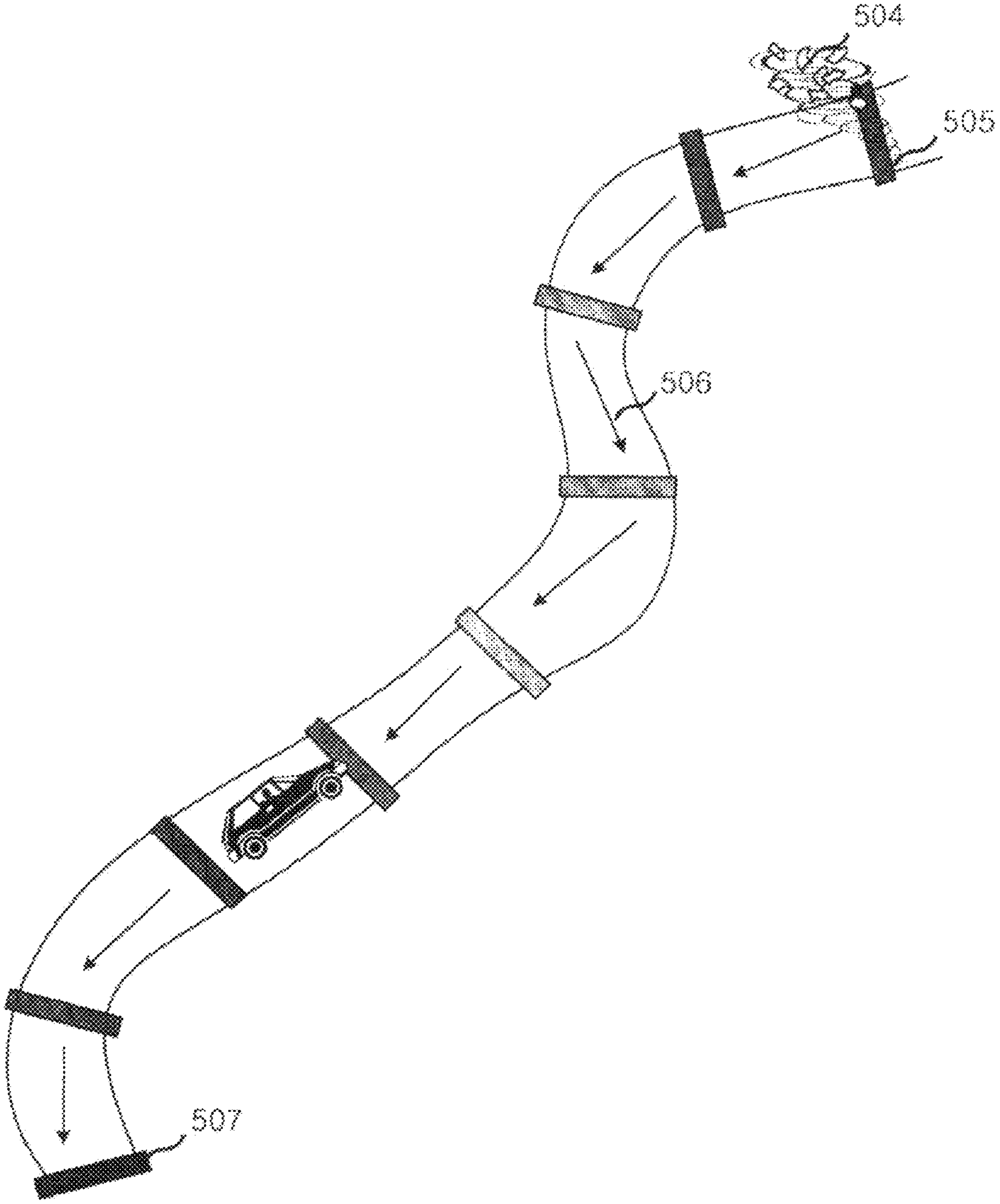
FIG. 8 shows a method for providing traffic jam information in a traffic jam condition in accordance with an embodiment of the present invention.
Figure 9:
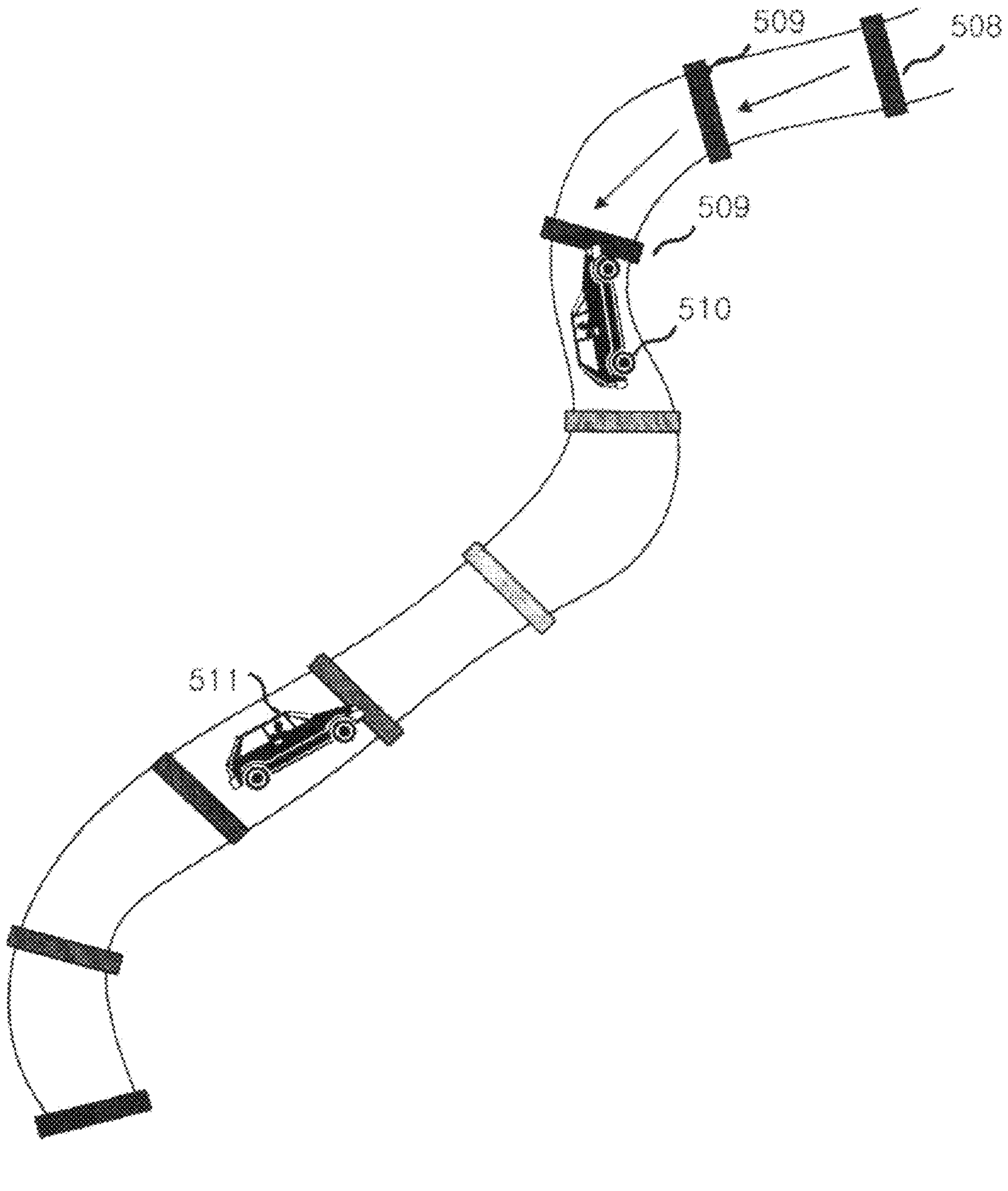
FIG. 9 shows a method for providing traffic jam information in a smooth traffic condition after solving traffic jam in accordance with an embodiment of the present invention.

FIGS. 7 to 9 illuminate a method for providing traffic jam information and a method for receiving traffic jam information in an apparatus for receiving traffic jam information mounted on a vehicle.

That is, FIG. 7 shows a method for providing traffic jam information in a smooth traffic condition in accordance with an embodiment of the present invention, FIG. 8 shows a method for providing traffic jam information in traffic jam in accordance with an embodiment of the present invention, and FIG. 9 shows a method for providing traffic jam information in a smooth traffic condition after traffic jam is relieved in accordance with an embodiment of the present invention.

Hereinafter, with reference to FIGS. 7 to 9, a method for providing traffic jam information and a method for receiving traffic jam information in an apparatus for receiving traffic jam information mounted on a vehicle will be described.

As shown in FIG. 7, in case of smooth traffic condition while a driver 501 drives on a road, the apparatus 503 for providing traffic jam information installed on a road displays 'smooth traffic' in green color to a driver.

As shown in FIG. 8, the apparatus 505 for providing traffic jam information installed on a road collects weight information, vibration and noise information generated on a road, and determines the traffic jam and the traffic jam type based on the collected traffic jam information.

In case that an accident occurs in a front road, or traffic jam is induced due to an unknown reason 504, the apparatus 505 for providing traffic jam information installed on a road converts a color of the LED board into a red color, and transmits the determined result (traffic jam and type) from a detection reference of the traffic jam information to an apparatus for providing traffic jam information installed on a rear road 506.

Next, an apparatus for providing traffic jam information installed on a rear road receives traffic jam information and checks how many numbers of apparatus for providing traffic jam information installed on a road are passed.

The apparatus for providing traffic jam information installed on a road converts the color of the LED board from a red color 505 into a blue color 507, or displays a distance from an accident point and a jam point with a character by calculating a distance from a reference point according to the checked numbers of apparatus.

Further, the apparatus for providing traffic jam information installed on a road transmits the received traffic jam information to another apparatus for providing traffic jam information installed on a rear road through a wireless communication.

In the present invention, the number of colors of the LED board, the meaning of each color, an installation gap of the apparatus for providing traffic jam information and a color assignment to each installation gap are not mentioned, and will be determined by a normal application and a common sense.

As shown in FIG. 9, the apparatus for providing traffic jam information installed on a road converts a color of the LED board into a blue color 508, and transmits the converted traffic jam information to another apparatus 509 for providing traffic jam information installed on a rear road if a smooth traffic condition is detected in case that traffic condition is a smooth traffic condition.

Next, as the traffic jam information is transmitted to the second apparatus for providing traffic jam information installed on a road and an apparatus for receiving traffic jam information mounted on a vehicle, the color of the LED board is converted into the blue color.

Accordingly, in case that a vehicle 510 drives on a neighboring road with the apparatus for providing traffic jam information installed on a road which detects a smooth traffic condition, the vehicle slows down upon a command of the apparatus for providing traffic jam information installed on a road. If the color of the LED board of the apparatus for providing traffic jam information installed on a road is converted into the blue color, the vehicle 510 accelerates its speed.

A vehicle 511 which drives on a neighboring road with apparatus for providing traffic jam information installed on a road which was informed of the smooth traffic condition slows down according to a color of the non-converted LED board until the traffic jam information is updated.

Since the traffic jam information between the apparatuses for providing traffic jam information installed on a road is updated in real-time, the vehicle 511 accelerates its speed.

FIG. 10 shows a configuration of traffic jam information used in an apparatus for providing traffic jam information in accordance with an embodiment of the present invention.

As shown in FIG. 10, the traffic jam information 60 transceived through the traffic jam information transceiving unit 13 includes apparatus identifier 61, the frequency number of data generation 62, the number of passed apparatuses 63, installation gap information 64, and traffic information 65.

The apparatus identifier 61 includes an identifier of the apparatus for providing traffic jam information installed on a road which generates the traffic jam information. The apparatus for providing traffic jam information installed on a road receives only information corresponding to the previously stored identifier of the apparatus based on the apparatus identifier 61.

The frequency number of data generation 62 represents how many times the apparatus for providing traffic jam information having the apparatus identifier 61 generates data. This is used for the apparatus for providing traffic jam information to check whether the data are valid data by comparing the frequency number of data generation of the previously stored traffic jam information with the current frequency number of data generation 62.

The number of passed apparatuses 63 represents that how many apparatuses for providing traffic jam information installed on a road transceives the received traffic jam information.

The installation gap information 64 represents an installation gap between the apparatuses for providing traffic jam information since the apparatus for providing traffic jam information is installed variably.

The apparatus for providing traffic jam information installed on a road calculates a distance from the apparatus for providing traffic jam information, which transmits the received traffic jam information, based on the number of passed apparatuses 63 and the installation gap information 64. That is, the distance from the apparatus for providing traffic jam information is calculated by multiplying the number of passed apparatuses 63 and the installation gap information 64.

The traffic information 65 includes information for outputting the traffic jam information through the LED board, and displaying or outputting the traffic jam information with a character or audio sound through a screen or a speaker by another apparatus for providing traffic jam information received the traffic jam information 60.

The traffic jam mentioned in the present invention is divided into 'jam associated with accident' and 'simple traffic jam without cause'. The apparatus for providing traffic jam information installed on a road, which receives the data, determines a validity of the received traffic jam information on a road ahead by acquiring the 'apparatus identifier 61 and the frequency number of data generation 62' from the received traffic jam information of the front road, and comparing the previously stored apparatus identifier 61 and the frequency number of data generation 62.

The apparatus for providing traffic jam information installed on a road discards the traffic jam information of a front road which is not valid according to the determination result. This is to discriminate forged information generated by the third person who has a malicious intention.

The apparatus identifier 61 and the frequency number of data generation 62 to be stored in the apparatus for providing traffic jam information installed on a road includes the information on the apparatus for providing traffic jam information installed on a road which is farthest for receiving the traffic jam information.

The apparatus identifier information 31 and the frequency number of data generation 62 of the apparatus for providing traffic jam information installed on a road, which is 2 km away from the reference point, are stored in order to inform a user of the traffic information of the road 2 km ahead through the apparatus for providing traffic jam information installed on a road.

Moreover, the apparatus for providing traffic jam information installed on a road processes the corresponding information by using an encryption method to protect the data.

Figure 11:
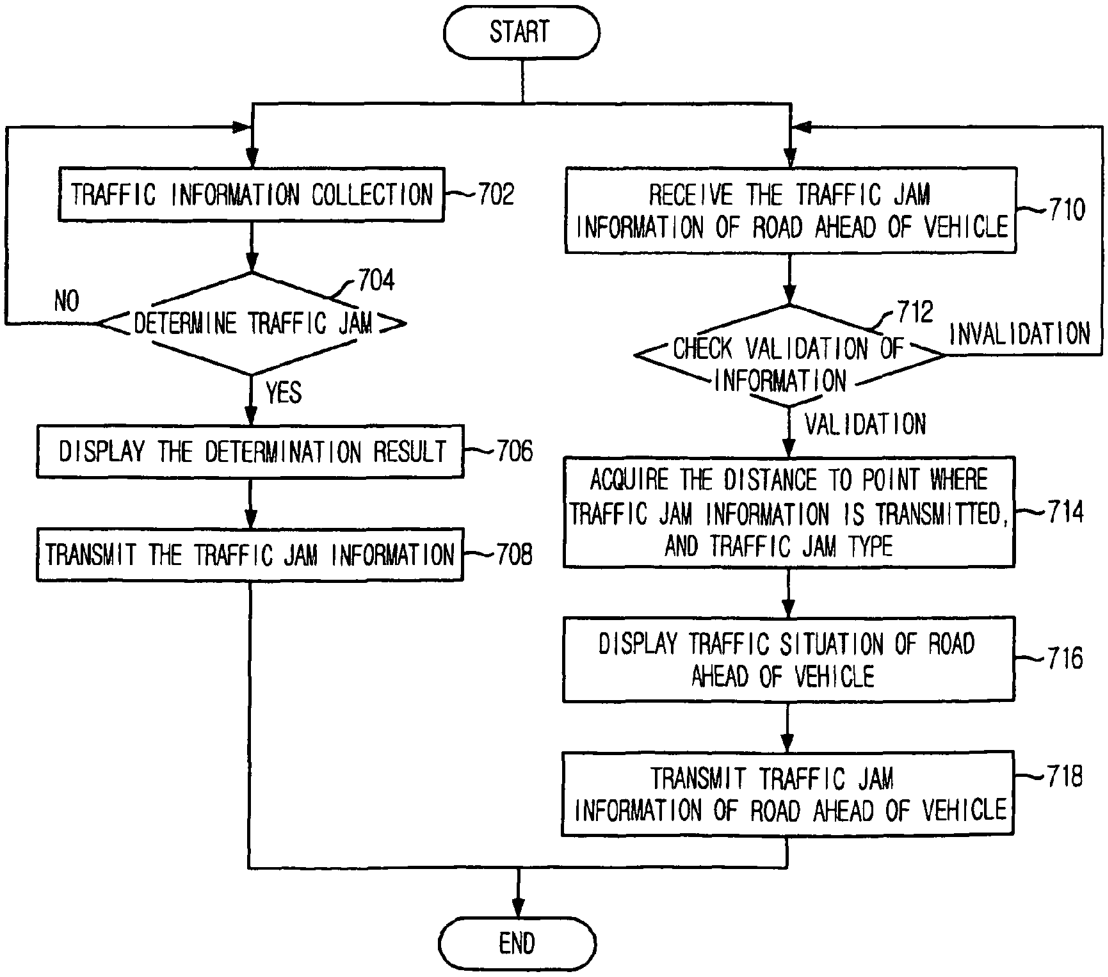
FIG. 11 shows a flowchart of a method for providing traffic jam information from a road in accordance with an embodiment of the present invention.

FIG. 11 shows a flowchart of a method for providing traffic jam information in accordance with an embodiment of the present invention.

The traffic information collection unit 11 collects the weight information of a vehicle driving on a road, the vibration and noise information generated on the road at step 702. That is, the traffic information collection unit 11 collects consistently the traffic information for a driving vehicle through 'a weight sensor and a vibration sensor' and 'a micro phone' which collects a vehicle collision noise and other noise that can be used to determine an accident.

The traffic jam determination unit 12 determines the traffic jam and the traffic jam type based on the weight information, the vibration information and the noise information collected at step 704. That is, the traffic jam determination unit 12 determines the traffic jam based on the weight information and the vibration information, and determines the traffic jam raised by an accident based on the noise information. If the collected traffic information is not determined as the traffic jam, the step '702' is consistently performed.

The display unit 14 displays the determination result at step 706, and displays simply and flickeringly the result determined at the step '704' on the LED board.

For example, the display unit provides a driver with the traffic jam information according to traffic jam types by flickering the LED board of a red color in case of a traffic jam raised by the accident, and by displaying the LED board of a red color in case of a simple jam. Moreover, the display unit 14 displays the traffic jam information by using a character or a symbol.

Then, the traffic jam information transceiving unit 13 transmits the traffic jam information including the determination result in the step '704' and 'the additional information for the distance calculation of traffic jam information transmitting point' through wireless communication at step 708. Here, the traffic jam information in the step '708' includes the number of passed apparatuses, installation gap, apparatus identifier, the frequency number of data generation. Then, the apparatus for providing traffic jam information installed on a road performs consistently the step '702' to check whether the accident is settled or jam is relieved.

However, the traffic jam information transceiving unit 13 receives the traffic jam information of a front road received from another apparatus for providing traffic jam information installed on a front road at step 710, and acquires 'the apparatus identifier' and 'the frequency number of data generation'.

The traffic jam information transceiving unit 13 determines a validation of the traffic jam information of a front road by comparing 'the previously stored apparatus identifier and the frequency number of data generation' with the acquired apparatus identifier and the frequency number of data generation at step 712. The traffic jam information transceiving unit 13 discards the traffic jam information of the front road which is invalidated by the determination result, and perform consistently the step '710' in case of an invalidation by the determination result.

The traffic jam information transceiving unit 13 acquires 'the distance to a point where traffic jam information is transmitted' and 'traffic jam type' at step 714. That is, the traffic jam information transceiving unit 13 calculates the distance to the point where the traffic jam information is transmitted by analyzing the number of passed apparatuses and the installation gap information included in the traffic jam information.

The display unit 14 displays the traffic information of a front road according to the distance information and the traffic jam type information acquired in the step '714' at step 716. The display unit 14 displays the traffic information of the front road on the LED board of different color according to the distance information and the traffic jam type information acquired in the step '714', or displays the traffic jam information using a character or a symbol. If the traffic jam type is caused by an accident, the display unit 14 arouses a driver's attention by outputting and flickering colors on the LED board.

Subsequently, the traffic jam information transceiving unit 13 transmits the received traffic jam information of the front road to another vehicle on a rear road after acquiring 'the distance to the point where the traffic jam information is transmitted' and 'the traffic jam type' in the step '714' at step 718.

Figure 12:
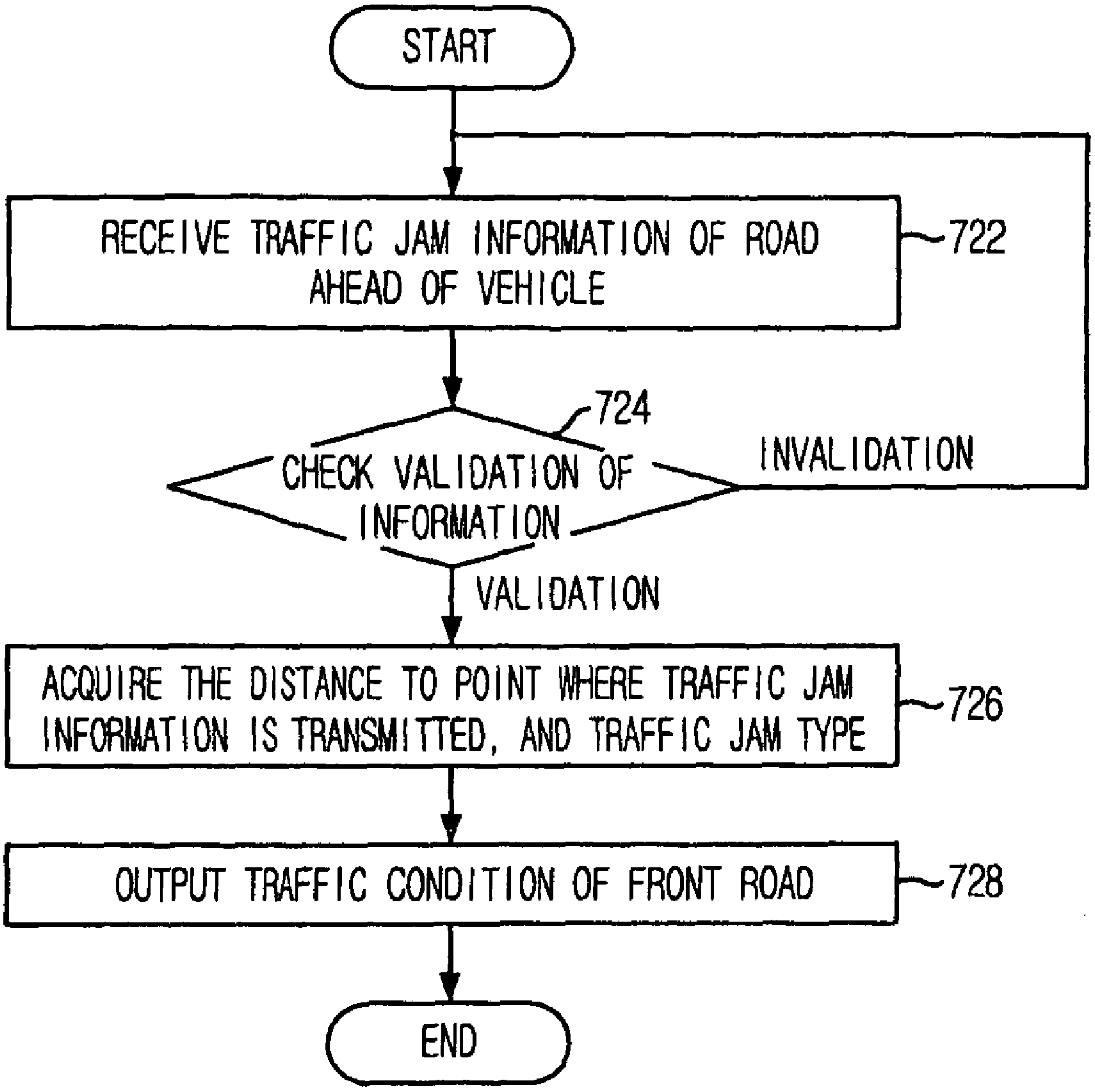
FIG. 12 shows a flowchart of a method for receiving traffic jam information in a vehicle in accordance with an embodiment of the present invention.

Meanwhile, FIG. 12 shows a flowchart of a method for receiving traffic jam information in accordance with an embodiment of the present invention.

A traffic jam information receiving unit 21 receives traffic jam information transmitted from a plurality of apparatuses for providing traffic jam information installed along a road at step 722, and determines the validation of the received traffic jam information based on the apparatus identifier and the frequency number of data generation from the received traffic jam information. The traffic jam information receiving unit 21 discards the traffic jam information which is invalidated by the determination result, and performs consistently the step '722' in a case of invalidation.

Here, the traffic jam information in the traffic jam information receiving unit 21 includes a traffic jam, a traffic jam type, additional information for calculating a distance to the point of the traffic jam information is transmitted, apparatus identifier information, and the frequency number of data generation. The additional information for calculating a distance of the transmitting point of the traffic jam information includes the number of passed apparatus and the installation gap information.

Subsequently, the traffic jam information receiving unit 21 acquires 'the distance to the point where the traffic jam information is transmitted' and 'the traffic jam type' after receiving the traffic jam information of the front road received from another apparatus for providing traffic jam information installed on a road at step 726.

The output unit 22 provides a user with the traffic information according to the result acquired in the step 726 at step 728. That is, the output unit 22 outputs the acquired result on a screen. The output unit 22 displays 'the distance of transmitting point of the traffic jam information' obtained in the step '726' on the character board or the LED board of different color.

The output unit 22 displays simply or flickeringly the traffic jam information on the LED board according to the traffic jam type, or displays the traffic jam information with a character or a symbol. Moreover, the output unit 22 outputs the result acquired in the step '726' through a speaker.

Subsequently, the apparatus for receiving traffic jam information mounted on a vehicle performs continuously the step '722' to receive the traffic jam information again.

The method of the present invention as mentioned above may be implemented by a software program and stored in a computer-readable storage medium such as CD-ROM, RAM, ROM, floppy disk, hard disk, magneto-optical disk, etc. This process may be readily carried out by those skilled in the art; and therefore, details thereof are omitted here.

While the present invention has been described with respect to certain preferred embodiments, it will be apparent to those skilled in the art that various changes and modifications may be made without departing from the spirits and scope of the invention as defined in the following claims.

What is claimed is:

1. An apparatus for providing traffic jam information installed on a road, comprising:

a traffic information collector configured to collect weight information of a vehicle running on a road and vibration and noise information generated on the road;

a traffic jam determinator configured to determine a traffic jam and a type of traffic jam based on the collected weight information, the vibration and noise information;

a traffic jam information transceiver configured to transmit the traffic jam information including the determination result of the traffic jam determinator, and configured to generate and configured to transmit traffic jam distance information and the type of traffic jam information of a front road based on received traffic jam information of the front road; and a display unit configured to display the determination result of the traffic jam determinator or a traffic condition of the front road based on the traffic jam distance information and the type of traffic jam information received from the traffic jam information transceiver, wherein the traffic jam information in the traffic jam information transceiver includes apparatus identifier and a frequency number of data generation.

2. The apparatus as recited in claim 1, wherein the traffic jam determinator determines the traffic jam based on the weight information and the vibration information, and determines the traffic jam associated with an accident based on the noise information.

3. The apparatus as recited in claim 1, wherein the traffic jam information in the traffic jam information transceiver includes the number of passed apparatuses and installation gap information, and additional information to calculate a distance to a point where the traffic jam information is transmitted.

4. The apparatus as recited in claim 1, wherein the traffic jam information transceiver determines validation of the received traffic jam information of a front road and discards the traffic jam information which is invalidated by the determination result by acquiring the apparatus identifier and the frequency number of data generation from the received traffic jam information of the front road, and comparing the acquired apparatus identifier and the frequency number of data generation with the stored previous apparatus identifier and the frequency number of data generation.

5. The apparatus as recited in claim 1, wherein the display unit displays simply or flickeringly the result determined by the traffic jam determinator through an LED board, or displays a traffic condition of the front road by using colors, characters and symbols on the LED boards according to the distance information and the traffic jam type information acquired by the traffic jam information transceiver.

6. A method for providing traffic jam information, comprising:

collecting weight information of a vehicle running on a road and vibration and noise information generated on the road;

configuring to determine a traffic jam and a type of traffic jam based on the collected weight information, the vibration and noise information;

transmitting traffic jam information including a determination result in the determining and additional information for calculating traffic jam distance information;

generating and transmitting the traffic jam distance information and the traffic jam information of a front road based on received traffic jam information of the front road; and displaying one of the determination result in the step of determining the traffic jam and a traffic condition of the front road based on the traffic jam distance information and the type traffic jam information, wherein the traffic jam information in the transmitting the traffic jam information further includes apparatus identifier and a frequency number of data generation.

7. The method as recited in claim 6, wherein the determining the traffic jam information determines the traffic jam based on the weight information and the vibration information, and determines the traffic jam associated with an accident based on the noise information.

8. The method as recited in claim 6, wherein the traffic jam information in the transmitting the traffic jam information includes the number of passed apparatus and installation gap information.

9. The method as recited in claim 6, wherein the acquiring the traffic jam information of the front road determines validity of the received traffic jam information of a front road and discards the traffic jam information which is invalidated by the determination result by acquiring the apparatus identifier and the frequency number of data generation from the received traffic jam information of the front road, and comparing the acquired apparatus identifier and the frequency number of data generation with the stored previous apparatus identifier and the frequency number of data generation.

10. The method as recited in claim 6, wherein the displaying displays simply or flickeringly the result determined by the traffic jam determinator on an LED board, or displays a traffic condition of the front road by using colors, characters and symbols on the LED boards according to the distance information and the traffic jam type information acquired in the step of acquiring the traffic jam information of the front road.

11. An apparatus for receiving traffic jam information mounted on a vehicle, comprising:

a traffic jam information receiver configured to receive the traffic jam information received from a plurality of apparatuses to provide traffic jam information installed on a road ahead of the vehicle, and to acquire a distance to a point where the traffic jam information is transmitted and a type of traffic jam from the received traffic jam information; and an output unit configured to inform a user of a traffic condition based on the result acquired from the traffic jam information receiver, wherein the traffic jam information in the traffic jam information receiver includes presence of a traffic jam, a traffic jam type, additional information for calculating a distance to a point where the traffic jam information is transmitted, apparatus identifier, and the frequency number of data generation.

12. The apparatus as recited in claim 11, wherein the additional information for calculating a distance to the point where the traffic jam information is transmitted includes the number of passed apparatus and the installation gap.

13. The apparatus as recited in claim 11, wherein the traffic jam information receiving unit determines validity of the received traffic jam information based on the apparatus identifier and a frequency number of data generation from the traffic jam information, and discards the traffic jam information which is invalidated by the determination result.

14. The apparatus as recited in claim 11, wherein the output unit comprising:

a display unit to output the result acquired by the traffic jam information receiver on a screen; and an audio output unit to output the result acquired by the traffic jam information receiver through a speaker.

15. The apparatus as recited in claim 14, wherein the display unit displays the distance to the point where the traffic jam information is transmitted acquired by the traffic jam information receiver on a character board or an LED board in a different color, displays simply or flickeringly on the LED board according to the traffic jam type, or displays the traffic jam information using a character or a symbol.

* * * * *